United States Patent
Spellman

(10) Patent No.: US 7,373,123 B2
(45) Date of Patent: May 13, 2008

(54) MULTIPLE TUNERS IN A SINGLE RADIO RECEIVER

(75) Inventor: Mark Spellman, Novi, MI (US)

(73) Assignee: Harman International Industries, Incorporated, Northridge, CA (US)

( * ) Notice: Subject to any disclaimer, the term of this patent is extended or adjusted under 35 U.S.C. 154(b) by 396 days.

(21) Appl. No.: 10/789,599

(22) Filed: Feb. 27, 2004

(65) Prior Publication Data

US 2005/0191979 A1   Sep. 1, 2005

(51) Int. Cl.
H04B 1/18 (2006.01)
(52) U.S. Cl. .............................. 455/186.1; 455/179.1; 455/214; 455/181.1
(58) Field of Classification Search .......... 455/186.1, 455/179.1, 214, 181.1, 171.1, 67.11, 67.14, 455/226.1, 423
See application file for complete search history.

(56) References Cited

U.S. PATENT DOCUMENTS

| | | | |
|---|---|---|---|
| 5,363,143 A | 11/1994 | Duffield | 348/564 |
| 5,471,659 A | 11/1995 | Wong et al. | 455/132 |
| 5,621,730 A | 4/1997 | Kelley | 370/70 |
| 5,644,623 A * | 7/1997 | Gulledge | 455/423 |
| 5,661,811 A | 8/1997 | Huemann et al. | 381/25 |
| 5,870,402 A | 2/1999 | Kelley et al. | 370/497 |
| 5,910,996 A * | 6/1999 | Eggers et al. | 455/186.1 |
| 6,038,434 A * | 3/2000 | Miyake | 455/186.1 |
| 6,246,885 B1 * | 6/2001 | Black et al. | 455/553.1 |
| 6,587,671 B1 * | 7/2003 | Kanago et al. | 455/67.11 |
| 6,628,930 B1 | 9/2003 | Vogt et al. | 455/131 |
| 6,665,409 B1 * | 12/2003 | Rao | 381/63 |
| 6,957,053 B1 * | 10/2005 | Moers | 455/186.1 |
| 7,263,332 B1 * | 8/2007 | Nelson | 455/66.1 |
| 2002/0025054 A1 * | 2/2002 | Yamada et al. | 381/310 |
| 2003/0053638 A1 | 3/2003 | Yasuhara | 381/86 |
| 2003/0091069 A1 | 5/2003 | Kraemer et al. | 370/487 |
| 2004/0081324 A1 * | 4/2004 | Lau et al. | 381/106 |
| 2005/0266813 A1 * | 12/2005 | Ricard et al. | 455/179.1 |

FOREIGN PATENT DOCUMENTS

| | | |
|---|---|---|
| CN | 1090112 A | 7/1994 |
| CN | 1092225 | 9/1994 |
| EP | 0 443 436 A | 8/1991 |
| EP | 0 584 839 A | 3/1994 |
| EP | 0 603 535 A1 | 6/1994 |
| EP | 1 265 368 A | 12/2002 |
| JP | 05-183461 | 7/1993 |
| JP | 05183461 A * | 7/1993 |
| JP | 06-204926 | 7/1994 |
| JP | 06204926 A * | 7/1994 |
| JP | 06260897 A2 | 9/1994 |

* cited by examiner

Primary Examiner—Lana Le
(74) Attorney, Agent, or Firm—Brinks Hofer Gilson & Lione

(57) ABSTRACT

A radio receiver having multiple AM/FM tuners. A first tuner and a second tuner may be connected with an antenna for generating a first and second composite audio output signal. A dual input digital signal processor may be connected with the first tuner and the second tuner. The first and second composite audio output signals are processed by the dual input digital signal processor to generate a first audio output signal and a second audio output signal. A first audio power amplifier may be connected with the dual input digital signal processor for receiving the first audio output signal and a second audio power amplifier may be connected with the dual input digital signal processor for receiving the second audio output signal.

26 Claims, 2 Drawing Sheets

MULTIPLE TUNERS IN A SINGLE RADIO RECEIVER

BACKGROUND OF THE INVENTION

1. Technical Field

This invention relates generally to radio receivers, and more particularly, to a radio receiver having multiple tuners that are capable of individually being tuned to a separate frequency setting.

2. Related Art

Modern radio receivers include a tuner that may be connected with an audio digital signal processor. The audio digital signal processor may be connected with an audio power amplifier that is typically used to drive at least one speaker. The tuner may also be connected with a control unit that may be used to tune the tuner to a frequency setting. As such, when tuned to a particular station or frequency setting, the radio receiver plays the program through some type of audible reproduction device such as a speaker system or headphones.

As briefly outlined above, radio receivers that are designed for use in homes and vehicles only allow one station or program to be listened to at a time. If another person in the room, another room in the house, or in the vehicle wants to listen to a different program or station, they will typically be forced to use a portable device such as a handheld radio with headphones or turn on a second radio receiver located elsewhere in the house. A need exists for a radio receiver that includes multiple tuners that are capable of being tuned to multiple stations at the same time, thereby allowing individual listeners to choose their own program or station. This would eliminate the need for having more than one radio receiver in different portions of homes and vehicles.

SUMMARY

This invention discloses a radio receiver that includes multiple AM/FM tuners that allow users of the radio receiver to tune to more than one program or radio station at the same time. The radio receiver may include at least two tuners that may be connected with a control unit. The control unit may allow users of the radio receiver to tune the tuners to separate radio stations. As such, in the case of a radio receiver having two tuners, some listeners may listen to one radio station and other listeners may listen to another radio station at the same time.

The control unit may also be used to monitor the signal quality of the signals that are being received by each of the tuners. If the level of quality falls below a predetermined threshold of quality, the control unit may switch the tuner experiencing a poor quality of reception to an alternative frequency. The control unit may monitor signal quality by checking field strength, adjacent channel disturbances, multipath reception, an error bit rate and so forth.

The tuners of the radio receiver may generate composite audio output signals that may be supplied to inputs of an audio digital signal processor ("DSP") and radio data system ("RDS") decoders. The composite audio output signals may contain RDS data that may be used by the radio receiver. The RDS decoders are capable of allowing the control unit to precisely tune the tuners to a desired program or frequency setting and may also receive data indicative of alternative frequencies for a particular station or program. The RDS decoders also allow the control unit to determine program service names, transmitter frequency and other types of radio data that may be associated with a respective station or frequency. Travel information may also be provided by the RDS data that is received by the first and second RDS decoders.

The composite audio output signals that are supplied to the audio DSP from the tuners are processed by the audio DSP and converted into audio output signals. The audio output signals of the audio DSP may then be supplied as inputs to audio power amplifiers that amplify the signals generated by the audio DSP. The outputs of the audio power amplifiers may be connected with a speaker system, more than one speaker system, or a plurality of headphone jacks. As such, the radio receiver disclosed herein allows a plurality of listeners to listen to radio stations of their choice without the requirement of each of the listeners having their own portable radio.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
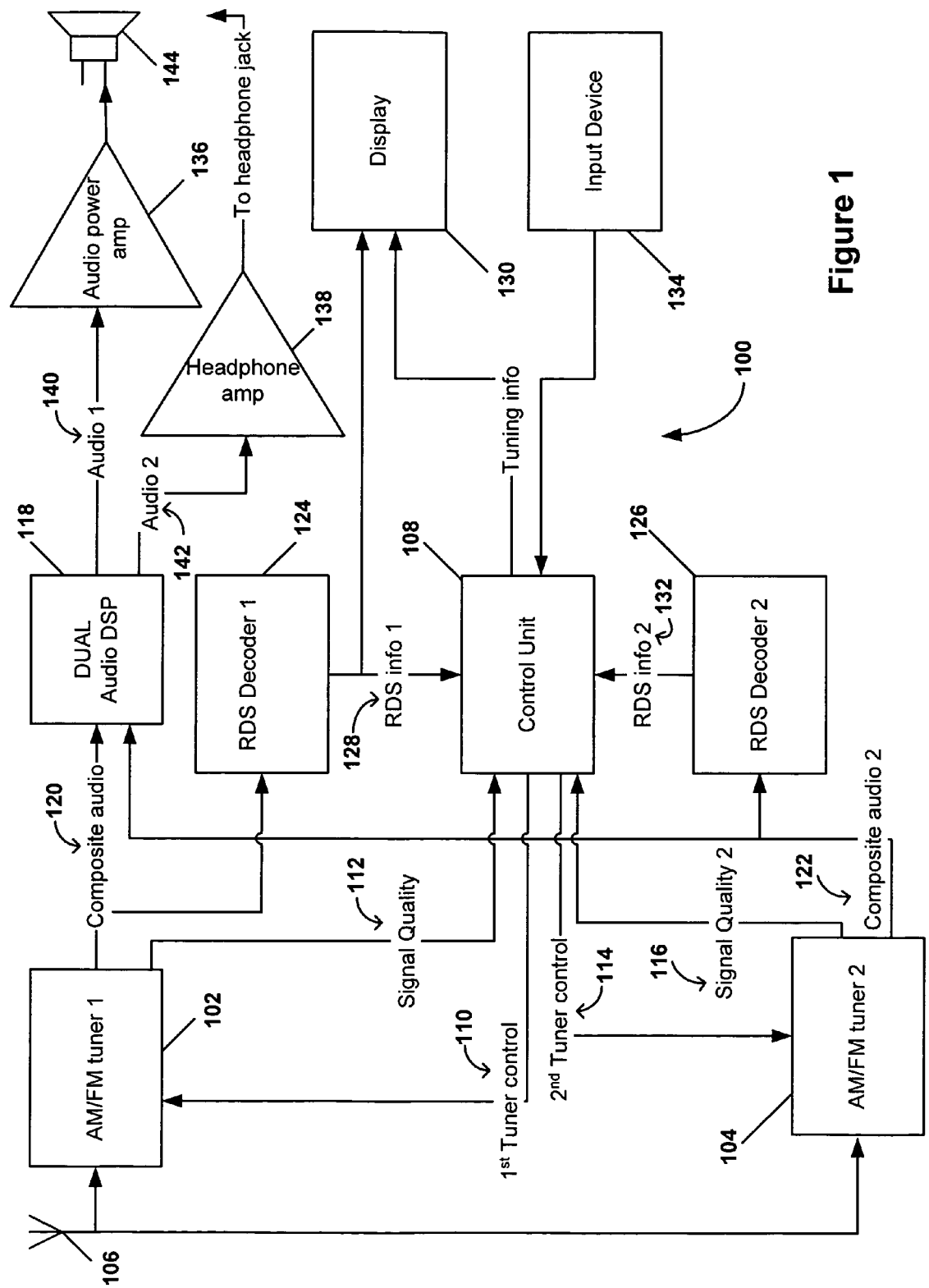
FIG. 1 is a block diagram of a radio receiver having multiple tuners.

In FIG. 1, a radio receiver 100 having multiple AM/FM tuners 102 and 104 is illustrated. A receiving antenna 106 may be connected with the first and second AM/FM tuners 102 and 104. The receiving antenna 106 may be a special transducer that converts incoming electromagnetic fields into alternating electric currents having the same frequency as the incoming electromagnetic fields. The first and second AM/FM tuners 102 and 104 may be a circuit or device that can be set to select one signal from a number of signals in a frequency band. Although two AM/FM tuners 102 and 104 are illustrated in the radio receiver 100 illustrated in FIG. 1, it is envisioned that additional AM/FM tuners 102 and 104 may be included in other example radio receivers 100.

The first and second AM/FM tuners 102 and 104 may be connected with a control unit 108 of the radio receiver 100. The control unit 108 may be used to control operational and functional aspects of the radio receiver 100. As illustrated, a first tuner control output 110 of the control unit 108 may be connected with the first AM/FM tuner 102. A first signal quality output 112 of the first AM/FM tuner 102 may also be connected with the control unit 108. Further, a second tuner control output 114 of the control unit 108 may be connected with the second AM/FM tuner 104. A second signal quality output 116 of the second AM/FM tuner 104 may be connected with the control unit 108.

The first and second tuner control outputs 110, 114 are used by the radio receiver 100 to set or tune the first and second AM/FM tuners 102 and 104 to respective frequency settings. Each tuner 102 and 104 is capable of being set to its own respective frequency or radio station so that more than one radio station may be listened to by users of the radio receiver 100. The first and second signal quality outputs 112 and 116 may provide signal quality readings or data to the control unit 108. The control unit 108 may then decide to switch to an alternative frequency if the signal quality falls below a predetermined threshold level of quality.

A dual audio DSP 118 may be connected with the first and second AM/FM tuners 102 and 104. In particular, a first tuned audio output or composite audio output 120 of the first AM/FM tuner 102 may be connected with an input of the dual audio DSP 118. A second tuned audio output or composite audio output 122 of the second AM/FM tuner 104 may be connected with another input of the dual audio DSP 118. The first and second composite audio outputs 120 and 122 contain signals that may be processed and converted by the dual audio DSP 118 into audio output signals. The first and second composite audio signals 120 and 122 are generated separately by the first and second AM/FM tuners 102 and 104 and each may be tuned to a separate frequency setting.

A first RDS decoder 124 may be connected with the first composite audio output 120 of the first AM/FM tuner 102. Further, a second RDS decoder 126 may be connected with the second composite audio output 122 of the second AM/FM tuner 104. The first and second RDS decoders 124 and 126 are capable of allowing the control unit 108 to precisely tune the first and second AM/FM tuners 102 and 104 to a desired program or frequency setting. In particular, the first and second RDS decoders 124 and 126 may assist the control unit 108 in tuning the first and second AM/FM tuner 102 and 104 to a station in a transmitter network using a number of alternative frequencies. Radio signals that are received by the receiving antenna 106 may contain RDS data; however, not all program service providers may provide RDS data. Although not specifically illustrated, in other examples of the invention the first and second RDS decoders 124 and 126 may be integrated as part of the dual audio digital signal processor 118. In addition, only one RDS decoder may be used in other examples and the audio signals from the first and second AM/FM tuners 102 and 104 may be directed to the single RDS decoder.

The first and second RDS decoders 124, 126 may also allow the control unit 108 to determine program service names, transmitter frequency and other types of radio data that may be associated with a respective station or frequency. This is possible because the control unit 108 is operable to allow the first and second AM/FM tuners 102 and 104 to be retuned within milliseconds. During this process, the audio signal may be muted by the control unit 108, which because of the short time period is not detectible by the human ear. As such, the radio receiver 100 is able to choose the best transmitter frequency, among a number of alternatives, which gives the best quality of reception. It also may assure that the switch-over is made to exactly the same program service by performing an identity check using a program identity code. Travel information, such as road conditions or accident alerts, may also be provided by the RDS data that is received by the first and second RDS decoders 124 and 126.

A first RDS information output 128 of the first RDS decoder 124 may be connected with the control unit 108. The first RDS decoder 124 may provide RDS data received by and associated with the frequency setting of the first AM/FM tuner 102 to the control unit 108. The first RDS information output 128 may also be connected with a display 130 that may display the RDS data received by the first RDS decoder 124. A second RDS information output 132 of the second RDS decoder 126 may also be connected with the control unit 108. The second RDS decoder 126 may provide RDS data received by and associated with the frequency setting of the second AM/FM tuner 104 to the control unit 108. Although not specifically illustrated, the second RDS information output 132 may also be connected with the display 130.

As briefly set forth above, the control unit 108 of the radio receiver 100 may also be connected with a display 130. The display 130 may be used to display channel/tuning information, volume information, RDS data, speaker balance information, equalizer information, time, date, temperature, and various other types of data commonly displayed on radio receiver displays. The control unit 108 may also be connected with an input device 134 that allows users to control the radio receiver 100. The input device 134 may allow users of the radio receiver 100 to tune the first and second AM/FM tuners 102 and 104 to various channels, change various listening options (speaker balance, equalizer settings, and so forth), adjust the volume, as well as other control and operational related functionality.

The dual audio DSP 118 may be connected with a first audio power amplifier 136 and a second audio power amplifier 138. As illustrated in FIG. 1, a first audio output 140 of the dual audio DSP 118 may be connected with an input of the first audio power amplifier 136. The first audio output 140 of the dual audio DSP 118 may provide audio signals that are received from the first AM/FM tuner 102 to the first audio power amplifier 136. As such, the station or frequency that the first AM/FM tuner 102 is tuned to can provide audio signals through the first audio output 140. In addition, the RDS data that is received from the first AM/FM tuner 102 may be displayed on the display 130.

A second audio output 142 of the dual audio DSP 118 may be connected with an input of the second audio power amplifier 138. The output of the first audio power amplifier 136 may be connected with an audio output device such as a speaker or speaker system 144. The output of the first audio power amplifier 136 may also be connected with a headphone jack as well. The second audio output 142 of the dual audio DSP 118 provides audio signals that are received from the second AM/FM tuner 104 to the second audio power amplifier 138. The output of the second audio power amplifier 138 may also be connected with a headphone jack, a speaker and/or a speaker system. It should be recognized that the outputs of the first and second audio power amplifiers 136 and 138 may be connected with different types of audio output devices, such as headphone jacks, speakers and/or speaker systems. In addition, each tuner may require its own audio amplifier and as such, in radio receivers with more than two tuners additional amplifiers may be required.

Figure 2:
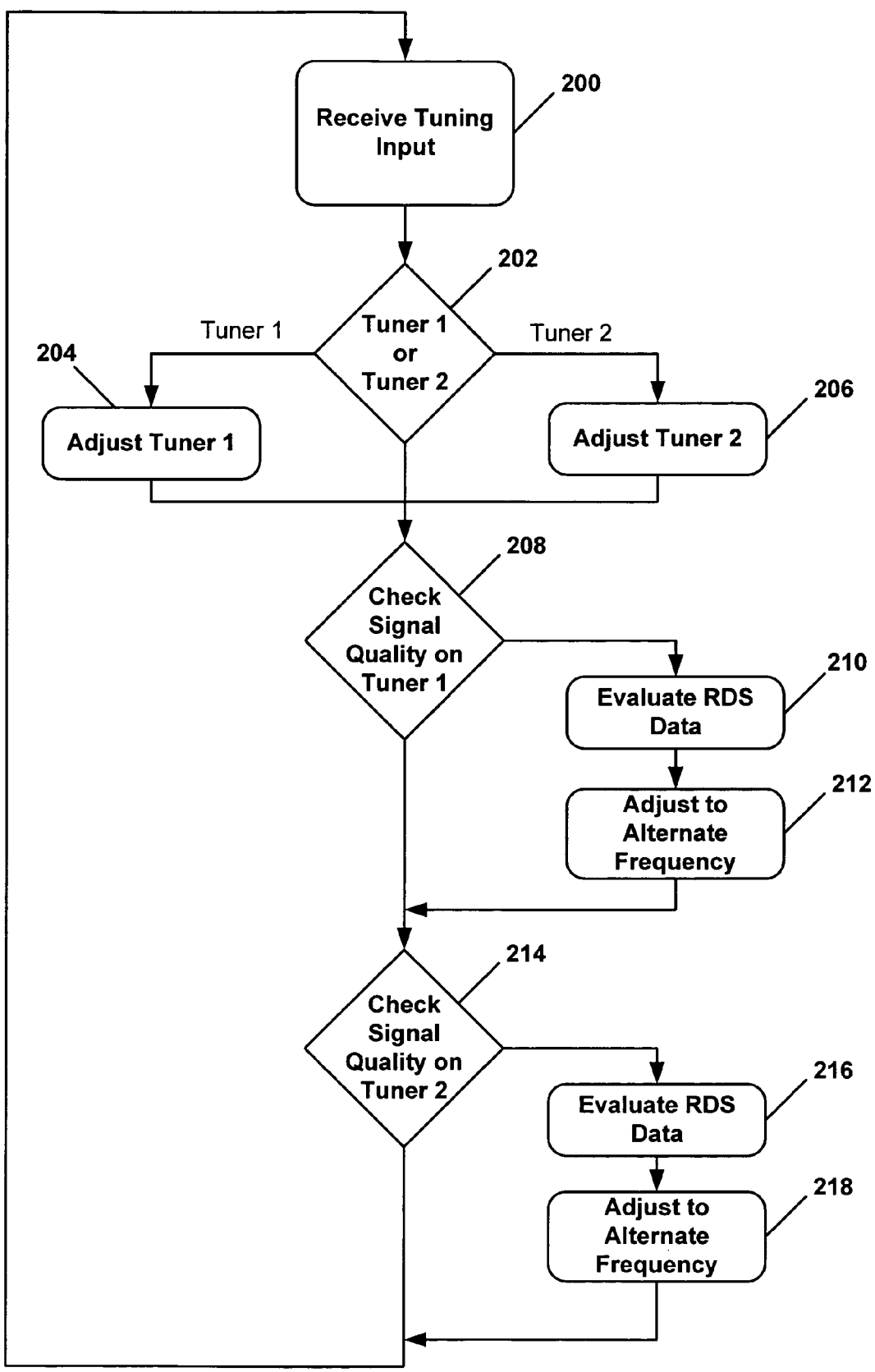
FIG. 2 is a flowchart illustrating some of the exemplary processes performed by the radio receiver disclosed in FIG. 1.

FIG. 2 is a flow chart illustrating some of the example process steps that may be performed by the control unit 108 of the radio receiver 100 during operation. At step 200, the control unit 108 may receive a tuning input that may be entered by a user using the input device 134 of the radio receiver 100. The control unit 108 may then determine if the user wants to adjust the first AM/FM tuner 102 or the second AM/FM tuner 104, which is illustrated at step 202. The input device 134 may also have two different input devices or dials that allow users to adjust the frequency of the first and second AM/FM tuner 102 and 104.

If the control unit 108 determines that the user wants to adjust the frequency setting for the first AM/FM tuner 102, at step 204 the control unit 108 may adjust the frequency setting of the first AM/FM tuner 102 to the frequency setting desired by the user. Likewise, if the control unit 108 determines that the user wants to adjust the frequency setting for the second AM/FM tuner 104, at step 206 the control unit 108 may adjust the frequency setting of the second AM/FM tuner 104 to the frequency setting desired by the user. The radio receiver 100 allows users to adjust the radio receiver 100 to more than one station or frequency setting so that more than one program may be listened to from a single radio receiver 100. Although two tuners are illustrated and discussed herein, it should be recognized that more than two tuners may be used in other examples of the radio receiver 100 disclosed by this specification.

The control unit 108 of the radio receiver 100 may also be responsible for ensuring that the first and second AM/FM tuners 102 and 104 are tuned to a frequency setting that has the best quality of signal for a selected program or frequency setting. Signal quality may be determined by checking field strength, adjacent channel disturbances, multipath reception, an RDS error bit rate and so forth. At step 208, the control unit 108 may check the signal quality of the first AM/FM tuner 102. If the signal quality is below a predetermined threshold level of quality, the control unit 108 may evaluate the signal quality of alternative frequencies for that particular program or station using RDS data, which is represented at step 210. Once, or if, an alternative frequency is found that has an acceptable signal strength or level of quality, at step 212 the control unit will adjust the first AM/FM tuner 102 to that respective alternate frequency.

As with the first AM/FM tuner 102, at step 214 the control unit 108 may check the signal quality of the second AM/FM tuner 104. If the signal quality of the second AM/FM tuner 104 is below a predetermined threshold, the control unit 108 may evaluate the signal quality of alternative frequencies for that particular program or station using RDS data, which is represented at step 216. Once, or if, an alternative frequency is found that has an acceptable signal strength or level of quality, at step 218 the control unit 108 will adjust the second AM/FM tuner 104 to the new frequency setting.

The radio receiver 100 disclosed herein provides listeners with the ability to listen to multiple radio stations from a single radio unit. The radio receiver 100 may include multiple AM/FM tuners 102 and 104 that may be tuned to different stations so that each listener can listen to his or her own station or program. Although not specifically illustrated, the input device 134 disclosed herein may be construed to include a volume control for all tuners, a fade and balance control for all tuners, an equalizer control for all tuners and so forth.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A radio receiver comprising:
   a first tuner configured to connect with an antenna and to generate a first audio signal;
   a second tuner configured to connect with the antenna and to generate a second audio signal;
   a digital signal processor configured to receive the first audio signal and the second audio signal, to also digitally process the first audio signal to generate a first processed audio output signal, and to digitally process the second audio signal to generate a second processed audio output signal, where the first audio signal and the second audio signal are digitally processed simultaneously by the digital signal processor;
   a first audio power amplifier connected with the digital signal processor, and configured to receive the first processed audio output signal; and
   a second audio power amplifier connected with the digital signal processor, and configured to receive the second processed audio output signal.

2. The radio receiver of claim 1 further comprising a control unit connected with the first tuner and the second tuner.

3. The radio receiver of claim 2 where the control unit is operable to generate a first tuner control output that is used to set the first tuner to a first selected frequency.

4. The radio receiver of claim 3 where the control unit is operable to generate a second tuner control output that is used to set the second tuner to a second selected frequency.

5. The radio receiver of claim 4, where first tuner is configured to generate a first tuner signal quality signal, and the control unit is configured to receive the first tuner signal quality signal, and to detect that the first tuner signal quality signal is less than a predetermined threshold of signal quality, and in response to the detection, to adjust the first tuner to a first tuner alternate frequency setting.

6. The radio receiver of claim 5, where the second tuner is configured to generate a second tuner signal quality signal, and the control unit is further configured to receive the second tuner signal quality signal, and to detect that the second tuner signal quality is less than the predetermined threshold of signal quality, and in response to the detection, to adjust the second tuner to a second tuner alternate frequency setting.

7. The radio receiver of claim 1 further comprising a first radio data system decoder connected with the first tuner and a control unit, and the first radio data system decoder is configured to generate first tuner data related to the first tuner.

8. The radio receiver of claim 7 further comprises a display unit operably coupled to the control unit, and the control unit is configured to receive the first tuner data and to control the display unit to display the first tuner data.

9. The radio receiver of claim 8 further comprising a second radio data system decoder connected with the second tuner and the control unit, and the second radio data system decoder is configured to provide second tuner data related to the second tuner to the control unit, and the control unit is further configured to control the display unit to display the second tuner data.

10. The radio receiver of claim 1 where the first audio power amplifier is connected with at least one speaker.

11. The radio receiver of claim 1 where the second audio power amplifier is connected with a headphone jack.

12. The radio receiver of claim 1 where the first audio power amplifier is connected with a vehicle speaker system and the second audio power amplifier is connected with a headphone jack.

13. A radio receiver comprising:
   a control unit;
   a first tuner configured to produce a first tuner output, wherein the first tuner is connected with the control unit, and the control unit configured to tune the first tuner to a first timer frequency setting;
   a second tuner configured to produce a second tuner output, wherein the second tuner is connected with the control unit, and the control unit configured to tune the second tuner to a second tuner frequency setting;

a digital signal processor connected with the first tuner and the second tuner, and the digital signal processor configured to digitally process the first tuner output generate a first digitally processed audio signal as a function of the first tuner frequency setting, and to also generate a second digitally processed audio signal as a function of the second tuner frequency setting, where the digital signal processor digitally processes the first tuner output and the second tuner output simultaneously;

a first audio power amplifier connected with the digital signal processor, and the first audio power amplifier is configured to receive the first digitally processed audio signal; and a second audio power amplifier connected with the digital signal processor, and the second audio power amplifier is configured to receive the second digitally processed audio signal.

14. The radio receiver of claim 13 further comprising:
a first and second radio data system decoder connected with the respective first tuner and second tuner and configured to provide respective first and second tuner RDS data;
the control unit is further configured to receive the respective first tuner RDS data and second tuner RDS data.

15. The radio receiver of claim 14 where the first tuner RDS data comprises a list of first tuner alternative frequencies for the first tuner frequency setting.

16. The radio receiver of claim 15 where the first tuner is configured to produce a first tuner signal quality signal, and the control unit is configured to receive the first tuner signal quality signal and to detect that the first tuner signal quality signal falls below a predetermined level of quality and, in response to the detection, to tune the first timer to one of the listed first tuner alternative frequencies.

17. The radio receiver of claim 16 where the second tuner RDS data comprises a list of second tuner alternative frequencies for the second tuner frequency setting.

18. The radio receiver of claim 17 where the second tuner is configured to generate a second tuner signal quality signal, and the control unit is configured to detect that the second tuner signal quality output is less than a predetermined level of quality and, in response to the detection, to tune the second tuner to one of the listed second tuner alternative frequencies.

19. The radio receiver of claim 17 further comprising a display unit operably coupled to the control unit, and the control unit further configured to control the display unit to display a portion of the first tuner RDS data and the second tuner RDS data.

20. The radio receiver of claim 13 where the first audio power amplifier is connected with a speaker system and the second audio power amplifier is connected with a headphone jack.

21. The radio receiver of claim 13 where the first audio power amplifier is connected with a vehicle speaker system and the second audio power amplifier is connected with a headphone jack.

22. A method of providing two radio tuner audio outputs comprising:
receiving first and second radio tuners tuner audio signals from respective first and second radios;
simultaneously digitally processing the first and second radio audio signals to generate respective first and second digitally processed audio signals;
generating respective first and second amplified processed audio signal based upon the respective first and second digitally processed audio signals;
generating respective first and second radio tuner signal quality signals related to the first and second radio tuner audio signals;
generating respective first and second quality detections in response to detection that the first and second radio tuner signal quality signals are less than a predetermined quality threshold value;
respectively tuning the first and second radio tuner to respective alternative frequencies in response to respective first and second quality detections;
outputting the first amplified processed audio output to a speaker; and
outputting the second amplified processed audio output to a headphone interface adapted to provide the second amplified processed audio output to a headphone.

23. The method of claim 22 further comprising:
generating respective first and second RDS data based on the first and second radio tuner audio signals, the respective first and second RDS data including the respective first and second alternative frequencies for the respective first and second radio tuner audio signals.

24. The method of claim 23, where the first and second radios are located in a vehicle.

25. The method of claim 24, where the speaker is positioned to provide audio to a driver of the vehicle.

26. The method of claim 25, where the headphone interface is positioned to provide audio to a passenger of the vehicle.

* * * * *

UNITED STATES PATENT AND TRADEMARK OFFICE
CERTIFICATE OF CORRECTION

PATENT NO.       : 7,373,123 B2                                    Page 1 of 1
APPLICATION NO.  : 10/789599
DATED            : May 13, 2008
INVENTOR(S)      : Mark Spellman It is certified that error appears in the above-identified patent and that said Letters Patent is hereby corrected as shown below:

In column 6, line 65, please delete "timer" and insert -- tuner --.

In column 7, line 5, please insert -- to -- following "output".

In column 7, line 36, please delete "timer" and insert -- tuner --.

In column 8, line 11, please delete "tuners".

In column 8, line 12, please delete "radios" and insert -- radio tuners --.

Signed and Sealed this

Second Day of September, 2008

JON W. DUDAS
*Director of the United States Patent and Trademark Office*